US011999043B2

(12) United States Patent
Hyde et al.

(10) Patent No.: US 11,999,043 B2
(45) Date of Patent: Jun. 4, 2024

(54) HYDRAULIC TOOL WITH INDICATOR LIGHT

(71) Applicant: Milwaukee Electric Tool Corporation, Brookfield, WI (US)

(72) Inventors: Brian J. Hyde, Brookfield, WI (US); Nathan J. Krause, Grafton, WI (US); Eric D. Norquist, Milwaukee, WI (US); Amanda M. Kachar, West Allis, WI (US)

(73) Assignee: Milwaukee Electric Tool Corporation, Brookfield, WI (US)

(*) Notice: Subject to any disclaimer, the term of this patent is extended or adjusted under 35 U.S.C. 154(b) by 525 days.

(21) Appl. No.: 17/235,540

(22) Filed: Apr. 20, 2021

(65) Prior Publication Data

US 2021/0323136 A1 Oct. 21, 2021

Related U.S. Application Data

(60) Provisional application No. 63/012,506, filed on Apr. 20, 2020.

(51) Int. Cl.
*B25F 5/00* (2006.01)
*B25F 3/00* (2006.01)

(52) U.S. Cl.
CPC ................ *B25F 5/005* (2013.01); *B25F 3/00* (2013.01)

(58) Field of Classification Search
CPC .. B25F 5/005; B25F 5/021; B25F 3/00; B25B 23/18
See application file for complete search history.

(56) References Cited

U.S. PATENT DOCUMENTS

| | | | |
|---|---|---|---|
| 7,306,052 B2 | 12/2007 | Vahabi-Nejad et al. | |
| 7,934,847 B2 | 5/2011 | Oomori et al. | |
| 8,308,034 B2 | 11/2012 | Shibata et al. | |
| 8,517,558 B2 | 8/2013 | Oomori et al. | |
| 8,573,322 B2 | 11/2013 | Nagasaka et al. | |
| 9,016,397 B2 | 4/2015 | Kuroyanagi et al. | |
| 9,457,461 B2 | 10/2016 | Francis et al. | |
| 9,573,257 B2 | 2/2017 | Kynast et al. | |
| 9,923,249 B2 | 3/2018 | Rejman et al. | |
| 2013/0062955 A1* | 3/2013 | Suzuki | H01M 50/296 307/77 |
| 2015/0165602 A1* | 6/2015 | Seith | B25B 23/1427 173/46 |
| 2018/0131151 A1 | 5/2018 | Chahrour et al. | |
| 2019/0308255 A1* | 10/2019 | Wason | B26B 15/00 |

FOREIGN PATENT DOCUMENTS

| | | |
|---|---|---|
| EP | 0941813 A1 | 9/1999 |
| WO | 2018/213226 A2 | 11/2018 |
| WO | 2020/069531 A1 | 4/2020 |

* cited by examiner

*Primary Examiner* — Teresa M Ekiert
(74) *Attorney, Agent, or Firm* — Quarles & Brady LLP

(57) ABSTRACT

A hydraulic tool includes a head at a first end of the hydraulic tool, where the head is configured to apply a mechanical force to a work piece; a body including a first surface; a back portion including: a second surface at a second end of the hydraulic tool that is opposite the first end; a third surface that is between the first surface and the second surface, where the third surface is inclined with respect to the first surface and the second surface; an indicator light; and a window, at least a portion of which is positioned on the third surface, where the window covers the indicator light; and a grip that extends from the body away from the first surface.

23 Claims, 19 Drawing Sheets

100

HYDRAULIC TOOL WITH INDICATOR LIGHT

RELATED APPLICATIONS

This application claims priority to U.S. Provisional Patent Application No. 63/012,506, titled "Hydraulic Tool" and filed Apr. 20, 2020, the entirety of which is incorporated herein by reference.

FIELD

The present disclosure relates generally to power tools. More particularly, the present disclosure relates to a hydraulic power tool.

BACKGROUND

A hydraulic tool can be used to crimp, shear, or cut a work piece, among other examples. In such tools, a hydraulic pump is typically utilized for actuating the tool. The force exerted by the pump can be used for closing jaws of the tool to perform a crimping, cutting, or shearing action on the work piece at a desired location. In some circumstances, it can be difficult for a user to determine whether the tool has performed a proper crimp, shear, or cut of the work piece. For example, deviations from acceptable tolerance ranges for some crimping, shearing, or cutting actions can be hard to detect by visual inspection. Additionally, work site conditions such as the work piece being suspended high above the ground can add difficulty. Therefore, there is a need for a tool with improved user feedback regarding whether a proper cut, shear, or crimp has been performed on a work piece.

SUMMARY

One aspect of the disclosure provides a hydraulic tool that includes a head at a first end of the hydraulic tool, wherein the head is configured to apply a mechanical force to a work piece; a body comprising a first surface; a back portion comprising: a second surface at a second end of the hydraulic tool that is opposite the first end; a third surface that is between the first surface and the second surface, wherein the third surface is inclined with respect to the first surface and the second surface; an indicator light; and a window positioned on the third surface, wherein the window covers the indicator light; and a grip that extends from the body away from the first surface.

Another aspect of the disclosure provides a method of operating a hydraulic tool, the method including: positioning a work piece within a head; activating a first actuator of the hydraulic tool, thereby causing the head to close upon the work piece; making a determination that a cutting, crimping, or shearing operation that satisfies a predetermined criterion has been performed on the work piece by the head; and causing an indicator light to emit a light that corresponds to the determination.

Yet another aspect of the disclosure provides a method of operating a hydraulic tool, the method including: positioning a work piece within a head; activating a first actuator of the hydraulic tool, thereby causing the head to close upon the work piece; making a determination that a cutting, crimping, or shearing operation that satisfies a predetermined criterion has not been performed on the work piece by the head; and causing an indicator light to emit a light that corresponds to the determination.

By the term "about" or "substantially" with reference to amounts or measurement values described herein, it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying drawings, wherein:

DETAILED DESCRIPTION

Figure 1:
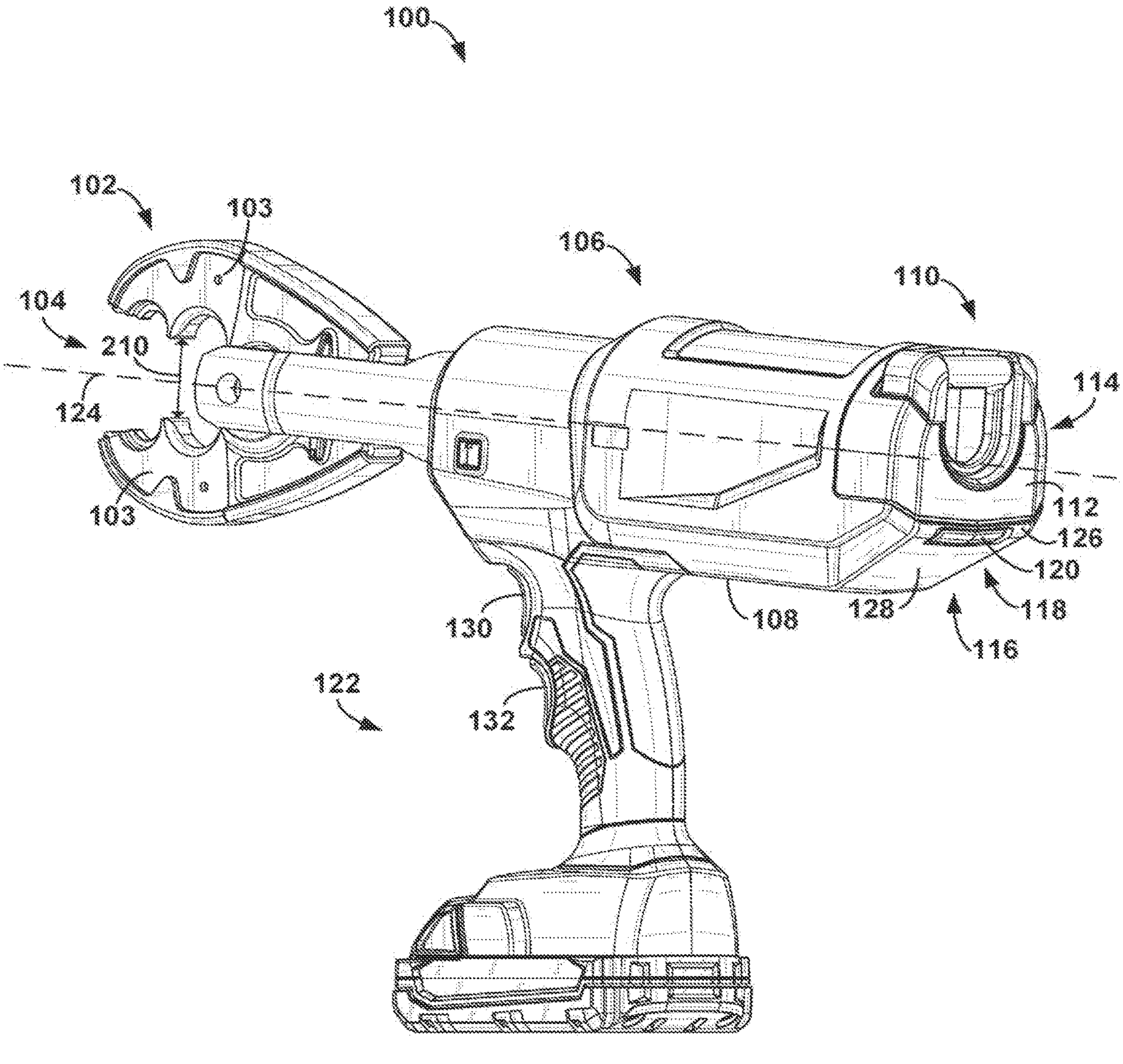
FIG. 1 is a perspective view of a hydraulic tool from the back and left according to one embodiment of the invention.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

As used herein, unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Hydraulic crimpers and cutters are types of hydraulic power tools for performing crimping and cutting work on a work piece. Hydraulic tools often include a hydraulic pump for pressurizing hydraulic fluid and transferring the fluid to a cylinder in the power tool. The cylinder includes a piston that can extend toward a cutting head of the power tool. The piston exerts a force on the cutting head, which may typically include opposed jaws with certain cutting features depending on the particular configuration of the power tool. The force exerted by the piston may be used for closing the jaws to perform cutting on a work piece, such as a wire, at a targeted cutting location.

Certain hydraulic cutting tools include a cutting tool head with jaws that pivot at a pivot point. Each of the jaws can include a cutting surface and a respective ear or extension. A portion of the cutting surface can be integral with or mounted to the ear, and a pivot pin can extend through each ear to form the pivot point. In some hydraulic cutting tools, when the jaws are in a closed position, the cutting surfaces adjacent to the ear can pass by each other. In use, the overlap of the cutting surfaces can prevent the jaws from fully cutting the work piece. For example, the jaws may jam or bind before the work piece is fully cut. In some hydraulic tools that include a cutting surface at least partially mounted to or formed with an ear, a cutting motion can cause jaws to flex or be pushed laterally away from the work piece.

A cutter is effective when the cutting tool can make a full cut on a work piece and avoid binding. Effective cutters also reduce or eliminate undesired flex and force on the jaws and blades during a cutting action. In general, a cutting tool configured to provide a full, controllable cut while limiting the force that urges jaws of the cutting tool laterally away from a work piece during a cutting action may be useful.

As noted above, there is a need for a hydraulic tool with improved user feedback regarding whether a proper cut, shear, crimp, or other operation has been performed on a work piece. In some situations, a user reaches above the user's head to put the tool in position to operate on the work piece. In other situations, the user holds the hydraulic tool well below the user's eyes (e.g., at waist level) to put the tool in position to operate on the work piece. Within examples, a hydraulic tool can provide a feedback mechanism that is convenient in both situations. For example, the hydraulic tool can include an indicator light that indicates whether the hydraulic tool has successfully or unsuccessfully operated on the work piece. The indicator light is positioned such that it is convenient for the user to view whether the tool is raised above the user's head or at waist level, for example.

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and complete and will fully convey the scope of the disclosure to those skilled in the art.

FIGS. 1-8 illustrate a hydraulic tool 100 according to one embodiment of the invention. With reference to FIG. 1, the hydraulic tool 100 includes a head 102 at a first end 104 of the hydraulic tool 100. The head 102 is configured to apply a mechanical force to a work piece. As shown, the head 102 takes the form of a crimping or cutting head comprising opposing jaws 103. However, in some embodiments, a head could be configured for shearing or another mechanical operation. The head 102 is hydraulically actuated and can be used to crimp an electrical connector to one or more conductors, cut conductors or structural cables, and/or to shear conductors or structural cables. Other examples are possible.

The hydraulic tool 100 also includes a body 106 that includes a first surface 108 (e.g., a lower surface). The body 106 can house various hydraulic and/or mechanical components that are configured to actuate the head 102 to operate on the work piece. The first surface 108 is parallel to a longitudinal axis 124 of the hydraulic tool 100. The longitudinal axis 124 can be within a plane of symmetry of the head 102 that bisects the head 102, for example. The body 106 extends longitudinally from the head 102 along the longitudinal axis 124.

The hydraulic tool 100 also includes a back portion 110 that includes a second surface 112 at a second end 114 of the hydraulic tool 100 that is opposite the first end 104. The back portion 110 also includes a third surface 116 that is between the first surface 108 and the second surface 112. The third surface 116 is inclined with respect to the first surface 108 and the second surface 112 and defines a plane that is skewed relative to the longitudinal axis 124 (e.g., plane is non-parallel to the longitudinal axis 124). In some embodiments, the plane defined by the third surface 116 is not perpendicular to the axis 124. The second surface 112 is perpendicular to the longitudinal axis 124. The third surface 116 includes a first portion 126 that abuts the second surface 112 and a second portion 128 that abuts the first surface 108. In the illustrated embodiment, a first edge 115 is formed where the first portion 126 abuts the second surface 112 (see, for example, FIG. 2). Similarly, a second edge 117 is formed where the second portion 128 abuts the first surface 108 (see, for example, FIG. 2). Each of the first and second edges 115, 117 can be configured as rounded exterior, obtuse corners.

The hydraulic tool 100 also includes an indicator light 118 and a window 120 positioned on the third surface 116. The window 120 (e.g., a snap on plastic window) overlaps the first portion 126 and the second portion 128 and covers and protects the indicator light 118 (e.g., a multi-color light emitting diode (LED) array, a discrete LED, or a light bulb). In the illustrated embodiment, the window 120 is disposed proximate to the first edge 115.

The hydraulic tool 100 includes a grip 122 that extends from the body 106 away from the first surface 108. The grip 122 extends generally away from the body 106 perpendicularly to the longitudinal axis 124. As shown, the grip 122 takes a form of a pistol grip, but other examples are possible. The grip 122 includes a first actuator 130 (e.g., a trigger) that, when activated, causes the head 102 to close (e.g., upon the work piece). The grip 122 includes a second actuator 132 that, when activated, causes the head 102 to open (e.g., away from the work piece). In some examples, the positions of the first actuator 130 and the second actuator 132 can be reversed. In some embodiments, the first and second actuators 130, 132 can be disposed along the grip 122 at an overlapping position.

The hydraulic tool 100 is configured (e.g., via a control system) to make a first determination that a cutting, crimping, or shearing operation (or another type of operation) that satisfies a predetermined criterion has been performed on the work piece by the head 102 and configured to cause the indicator light 118 to emit a first light that corresponds to the first determination. For example, the indicator light 118 emitting a green light could indicate that the operation performed by the head 102 on the work piece satisfies the predetermined criterion. Such predetermined criteria for evaluating an operation performed by the hydraulic tool 100 are discussed in more detail below.

The hydraulic tool 100 is also configured to make a second determination that a cutting, crimping, or shearing operation that satisfies a predetermined criterion has not (e.g., yet) been performed on the work piece by the head and configured to cause the indicator light to emit a second light that corresponds to the second determination. For example, the indicator light 118 emitting a red light could indicate that the operation performed by the head 102 on the work piece does not (e.g., yet) satisfy the predetermined criterion. Such predetermined criteria for evaluating an operation performed by the hydraulic tool 100 are discussed in more detail below.

Figure 2:
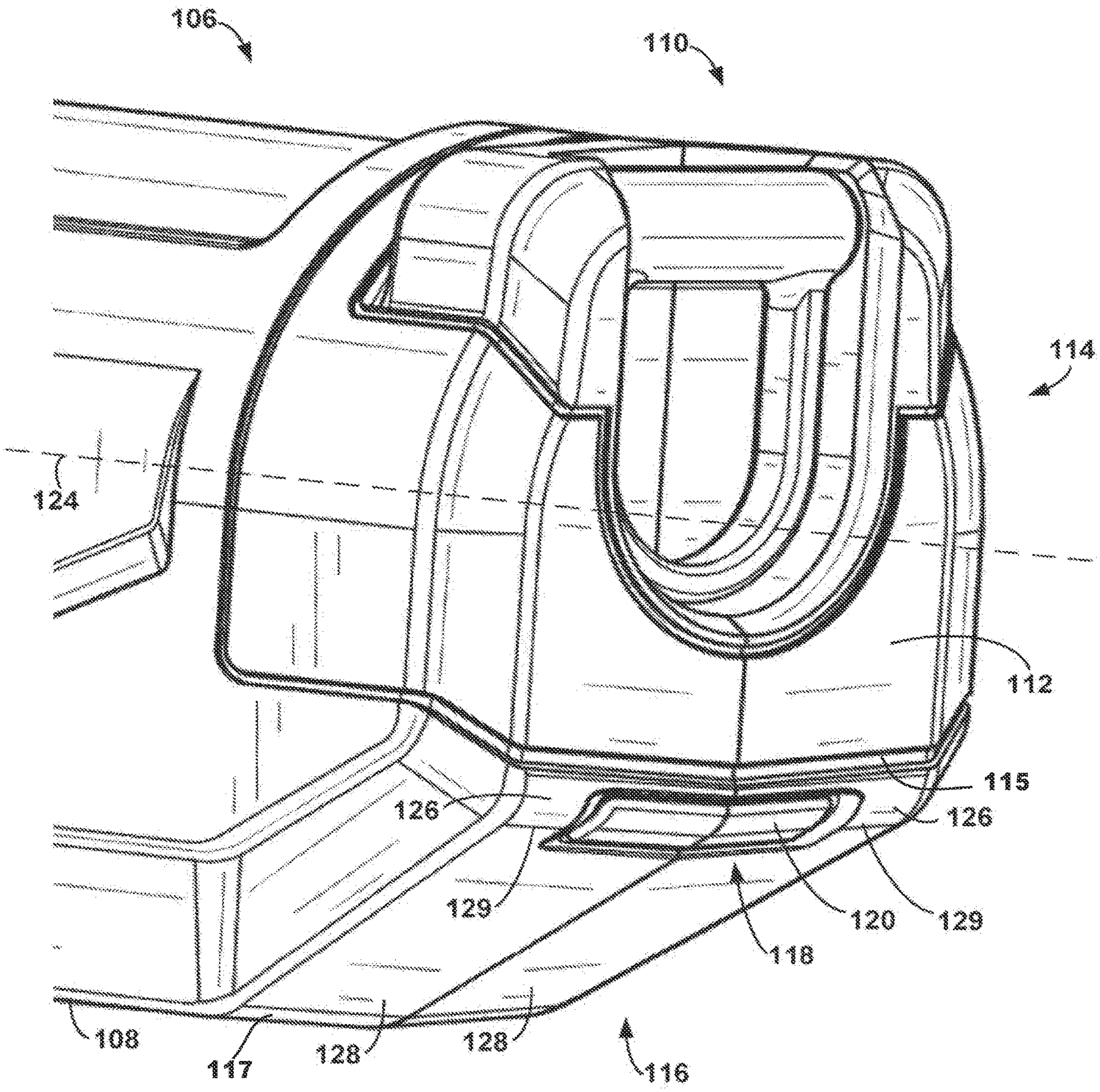
FIG. 2 is a close up view of the hydraulic tool of FIG. 1 from the back and left.

FIG. 2 is a close up view of the hydraulic tool from the back and left. That is, FIG. 2 is a close up view of the back portion 110. As shown in FIG. 2, the first portion 126 is separated from the second portion 128 by a boundary 129 (e.g., a seam). In a sense, the boundary 129 bisects the window 120 along a longitudinal axis of the window 120. The longitudinal axis of the window 120 is formed below the longitudinal axis 124 and extends perpendicular to the longitudinal axis 124. In another aspect, the window 120 is elongated in a direction substantially parallel to the boundary 129 that separates the first portion 126 from the second portion 128. The window 120 is rounded such that it conforms to the first portion 126 and the second portion 128 so that the window 120 extends into each of the first portion 126 and the second portion 128.

Figure 3:
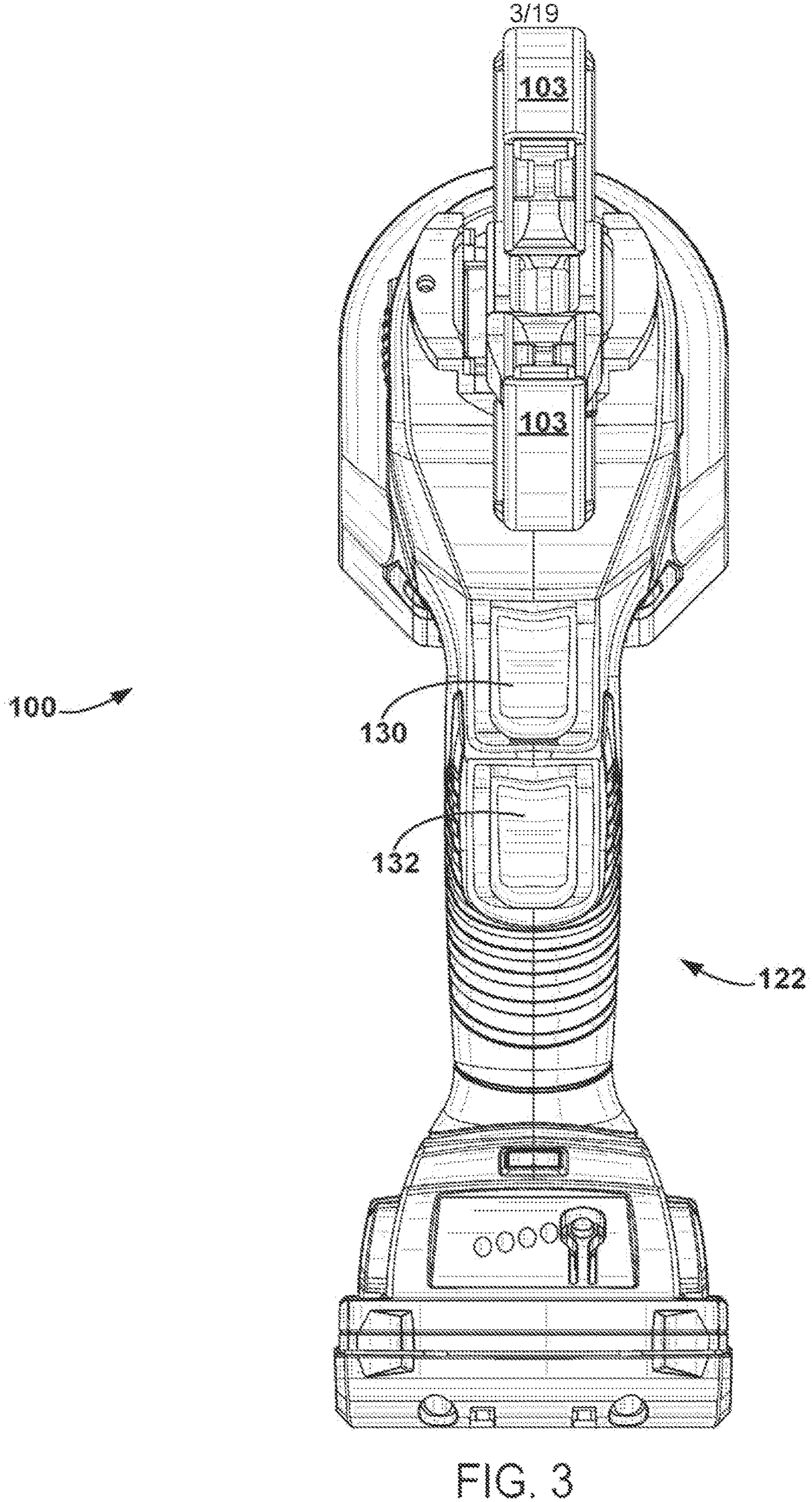
FIG. 3 is a front end view of the hydraulic tool of FIG. 1.

FIG. 3 is a front end view of the hydraulic tool 100. Each of the first and second actuators 130, 132 extend laterally across the grip 122. In the illustrated embodiment, the first actuator 130 is separated from the second actuator 132 by a portion of the grip 122.

Figure 4:
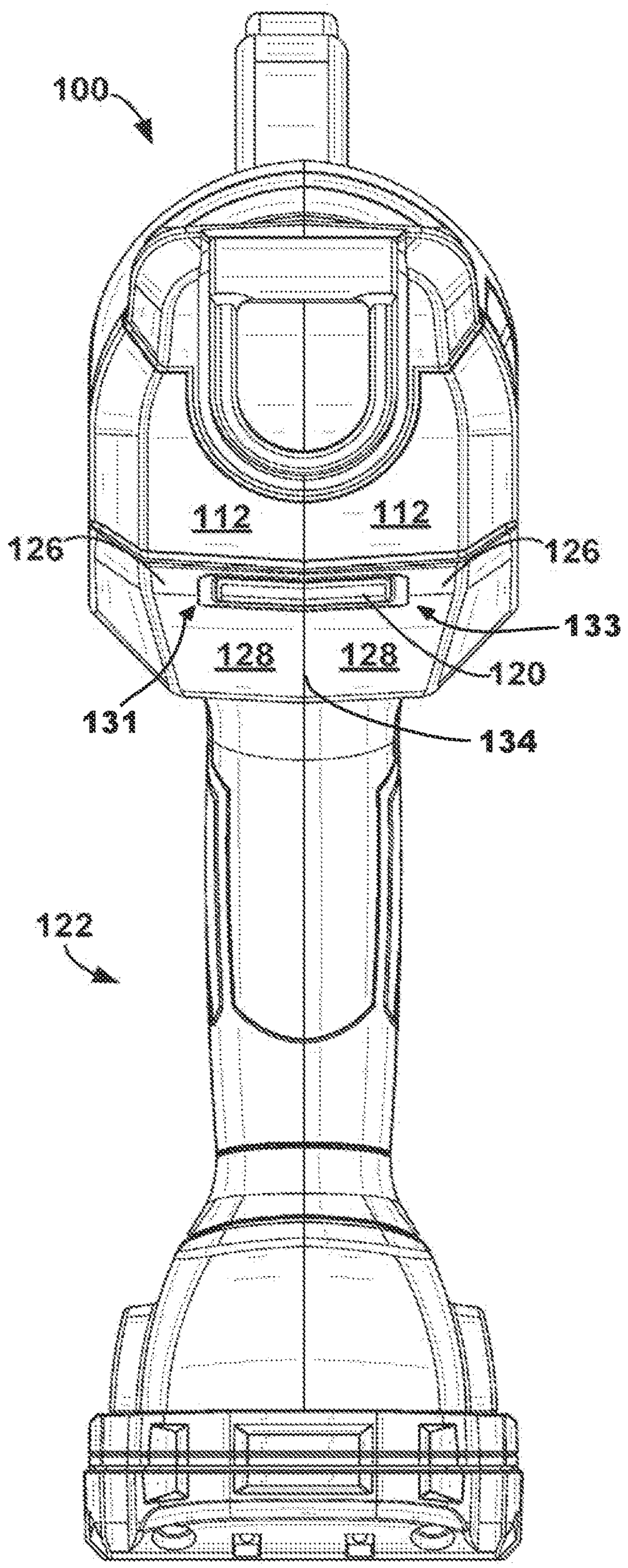
FIG. 4 is a back end view of the hydraulic tool of FIG. 1.

FIG. 4 is a back end view of the hydraulic tool 100 including the window 120. The window 120 extends between a first end 131 and a second end 133 across a perpendicular bisector 134. The perpendicular bisector 134 perpendicularly intersections the longitudinal axis 124. The longitudinal sides of the window 120 form a curve between the first end 131 and the second end 133 so that the first end 131 and the second end 133 are disposed closer to the longitudinal axis 124 than the portion of the window proximate to the perpendicular bisector 134.

Figure 5:
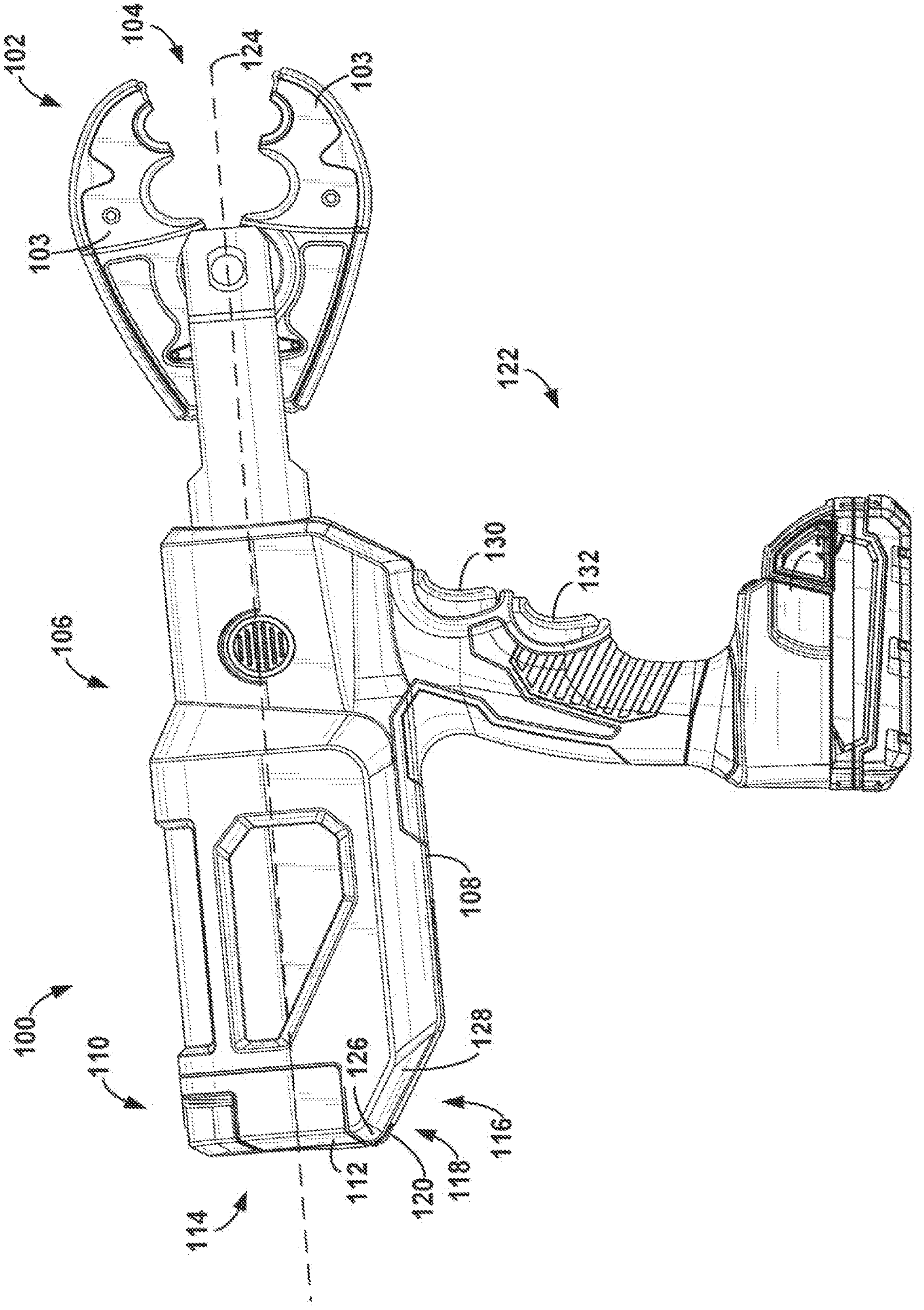
FIG. 5 is a right side view of the hydraulic tool of FIG. 1.
Figure 6:
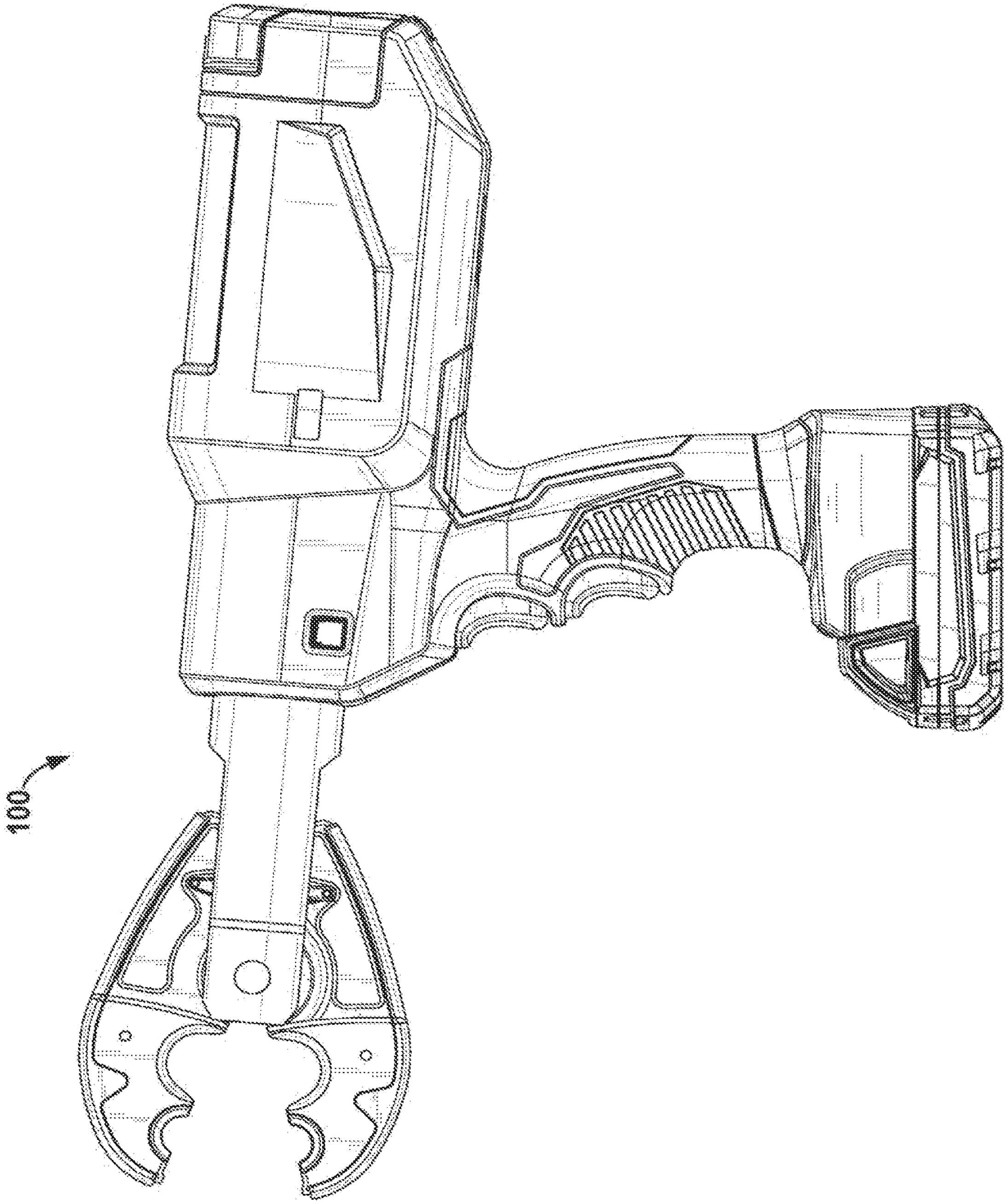
FIG. 6 is a left side view of the hydraulic tool of FIG. 1.
Figure 7:
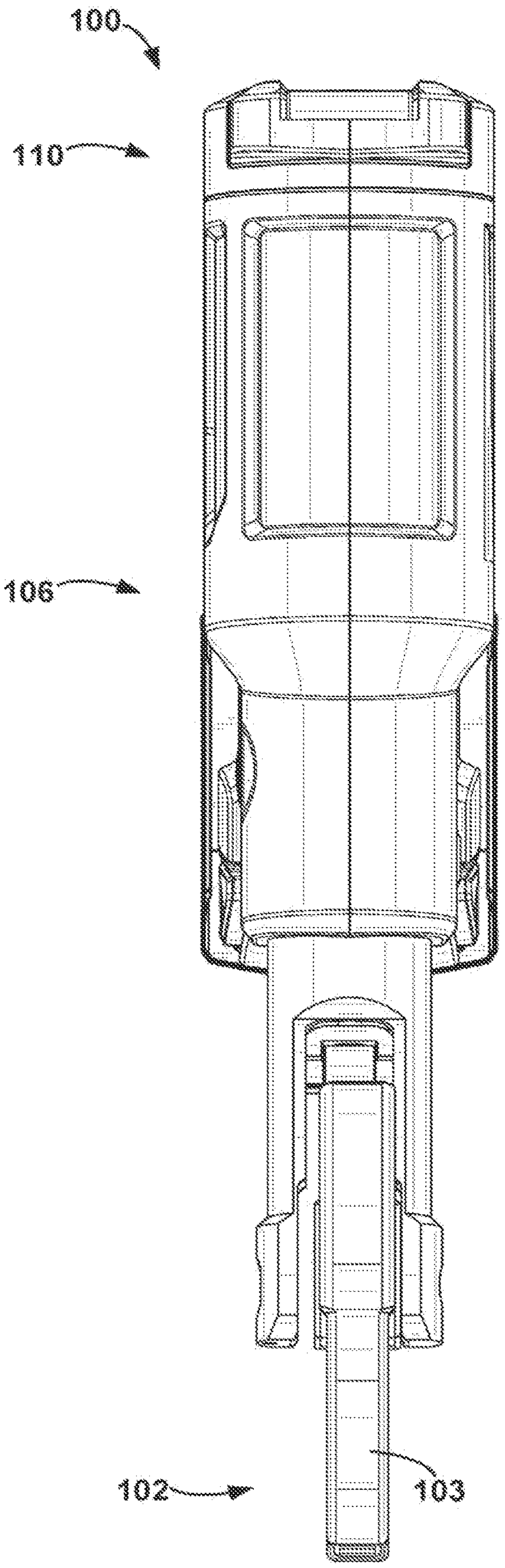
FIG. 7 is a top end view of the hydraulic tool of FIG. 1.
Figure 8:
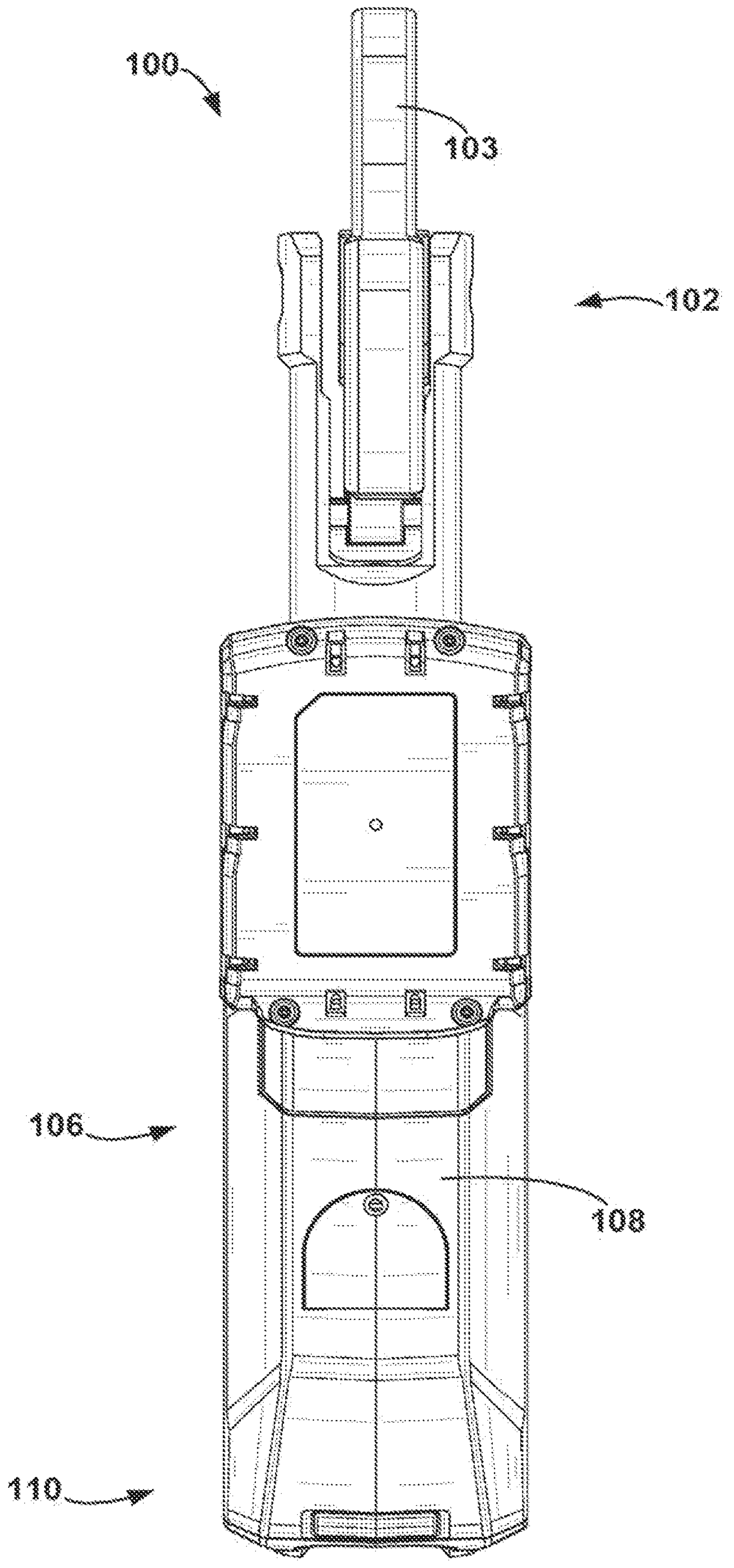
FIG. 8 is a bottom end view of the hydraulic tool of FIG. 1.

FIGS. 5-8 illustrate additional views of the hydraulic tool 100 according to embodiments of the invention. In particular, FIG. 5 is a right side view of the hydraulic tool 100, FIG. 6 is a left side view of the hydraulic tool 100, FIG. 7 is a top end view of the hydraulic tool 100, and FIG. 8 is a bottom end view of the hydraulic tool 100.

Figure 9:
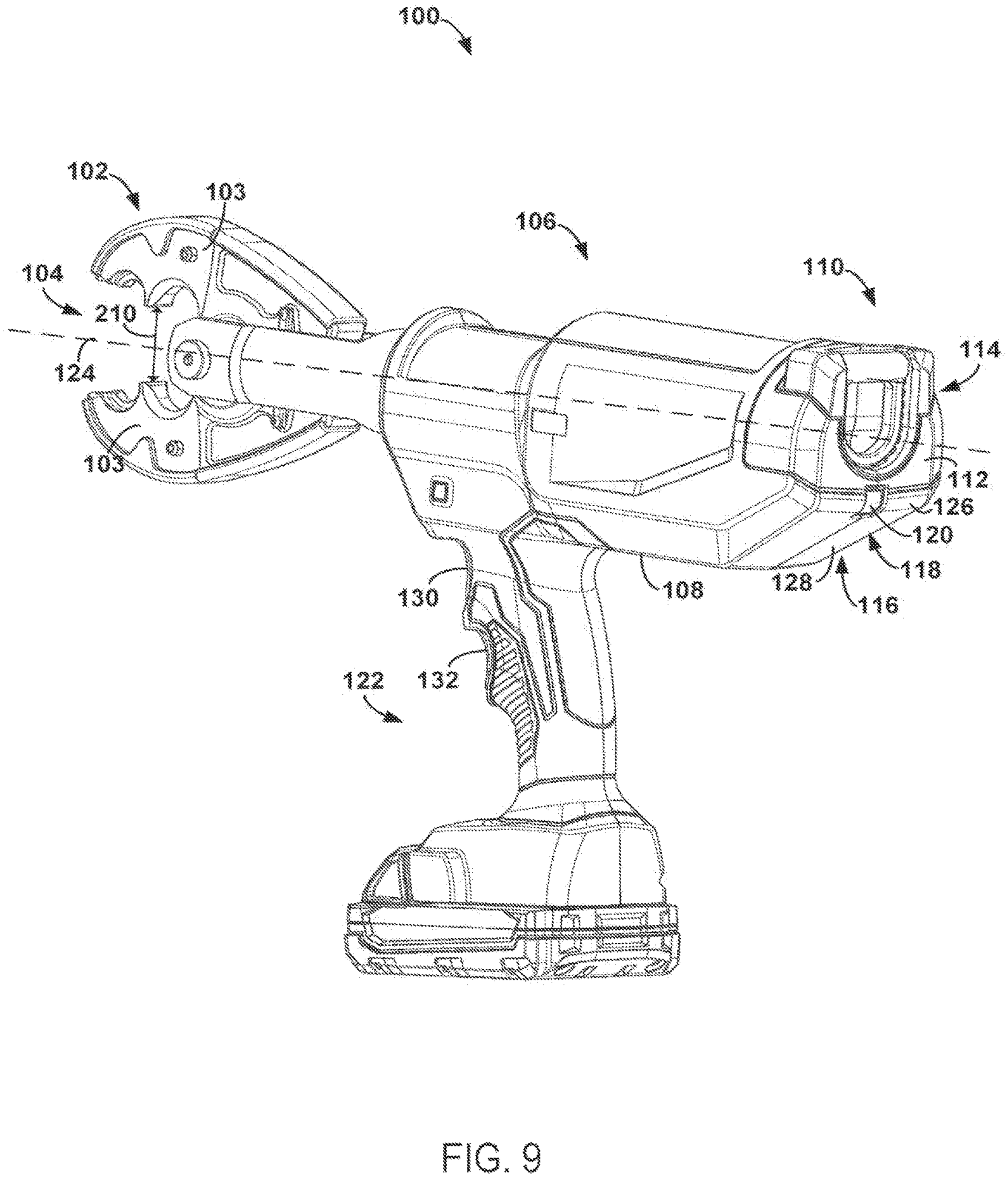
FIG. 9 is a perspective view of a hydraulic tool from the back and left according to another embodiment of the invention.
Figure 10:
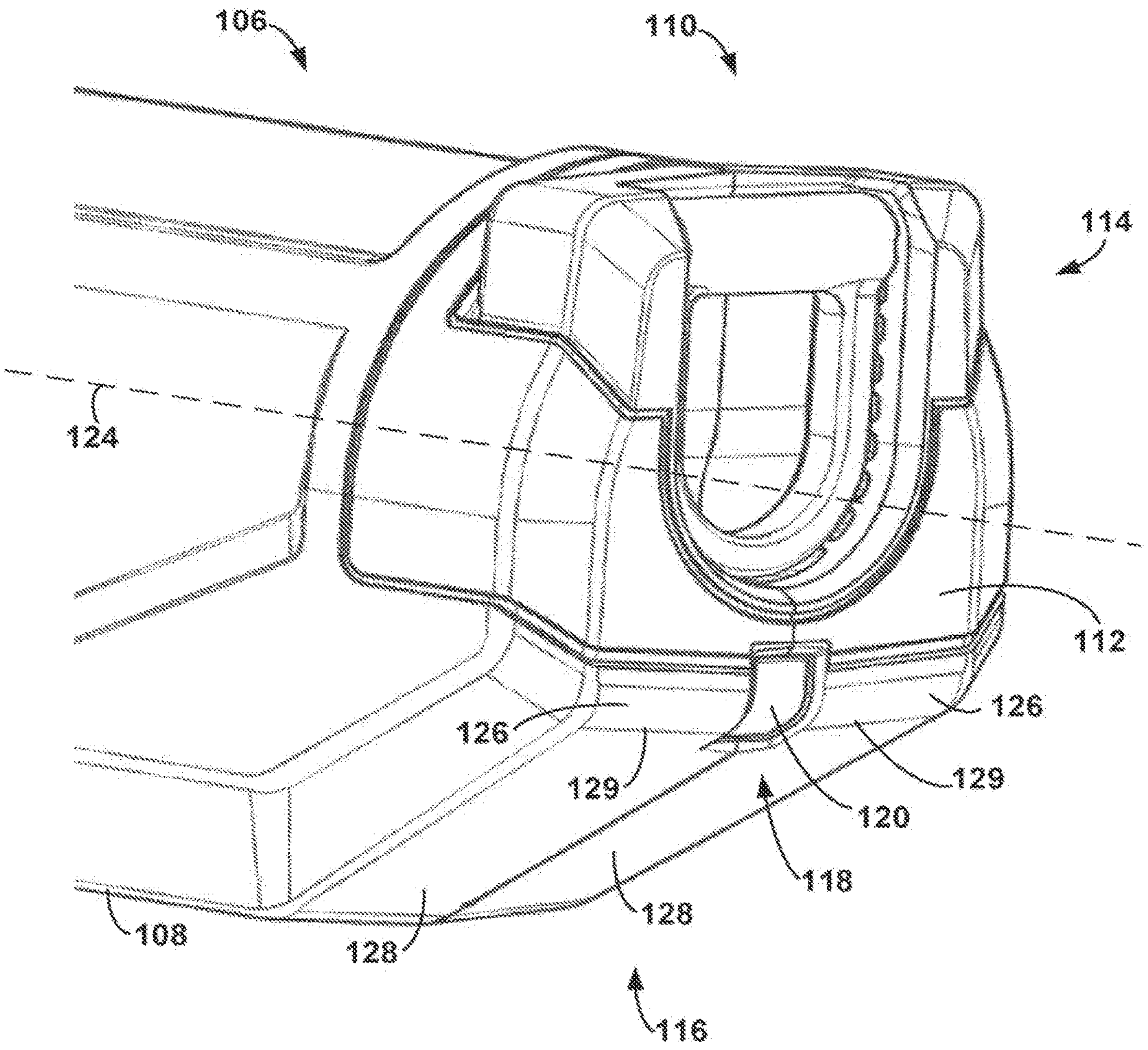
FIG. 10 is a close up view of the hydraulic tool of FIG. 9 from the back and left.

FIGS. 9-16 illustrate the hydraulic tool 100 according to another embodiment of the invention. With reference to FIGS. 9 and 10, another example window 120 defines a shape that is different from the window 120 shown in FIGS. 1-8.

Referring to FIG. 10, the window 120 is elongated in a direction that is substantially perpendicular to the boundary 129 that separates the first portion 126 from the second portion 128. As such, the window 120 is rounded such that it conforms to the second surface 112, the first portion 126, and the second portion 128 so that the window 120 extends into each of the first portion 126 and the second portion 128.

Figure 11:
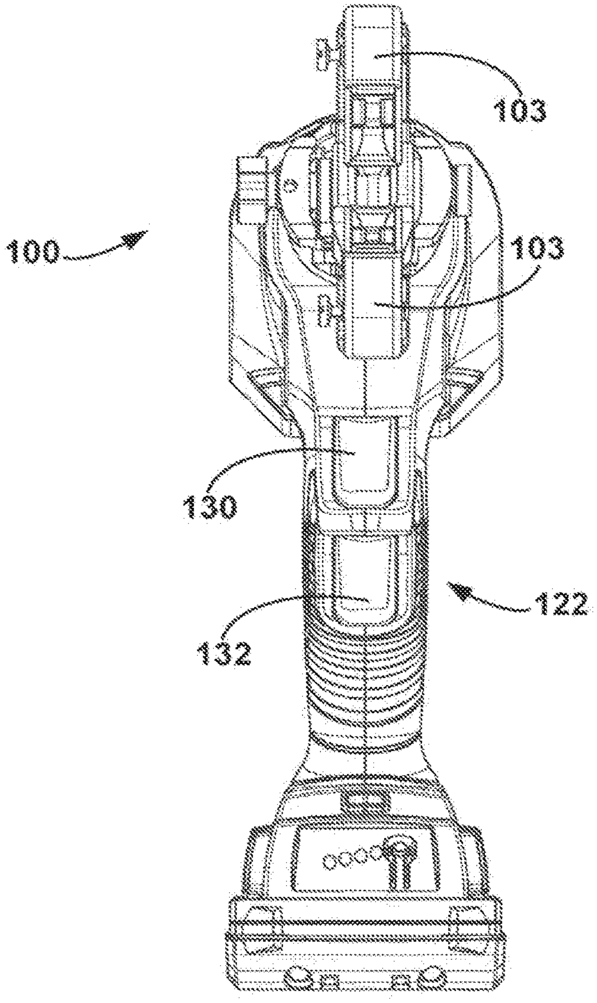
FIG. 11 is a front end view of the hydraulic tool of FIG. 9.
Figure 12:
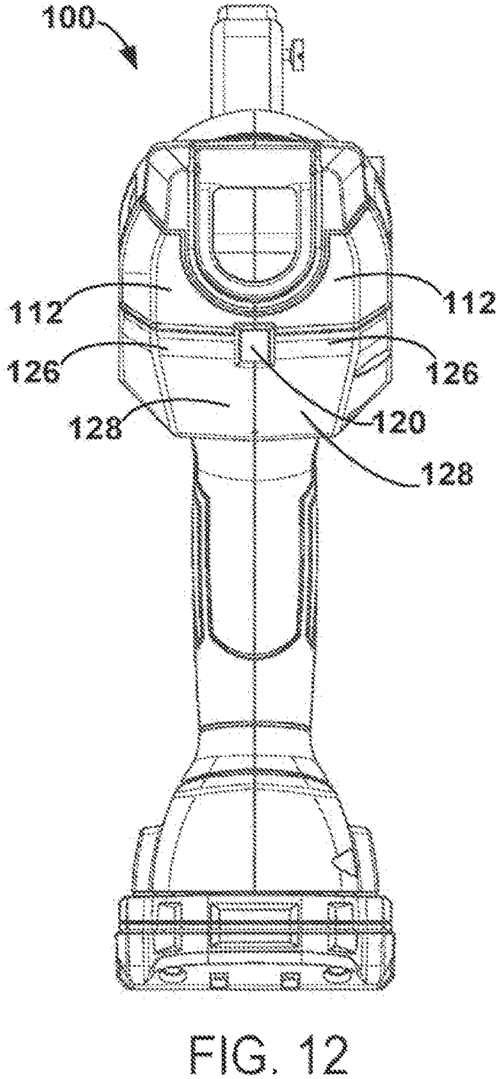
FIG. 12 is a back end view of the hydraulic tool of FIG. 9.
Figure 13:
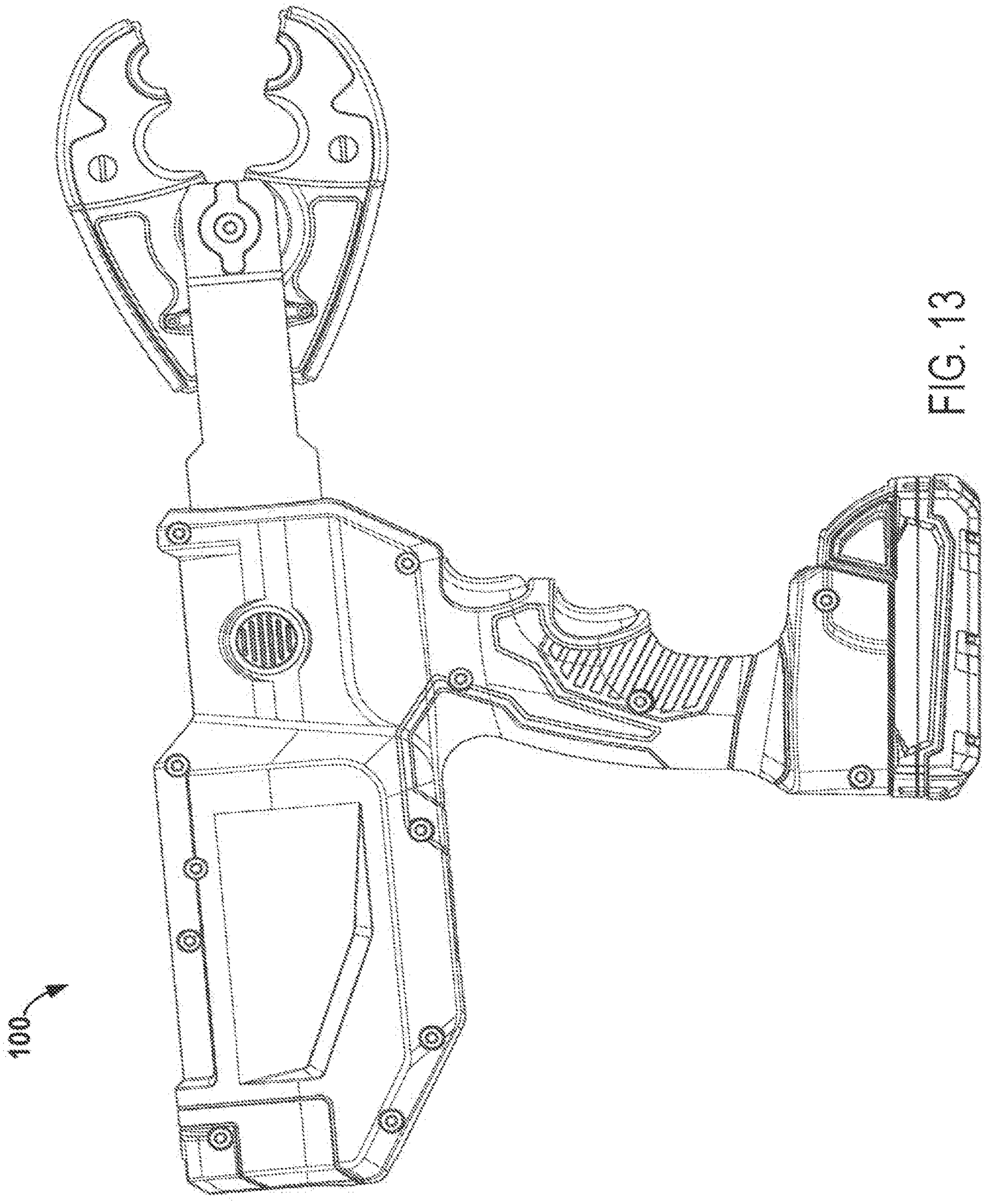
FIG. 13 is a right side view of the hydraulic tool of FIG. 9.
Figure 14:
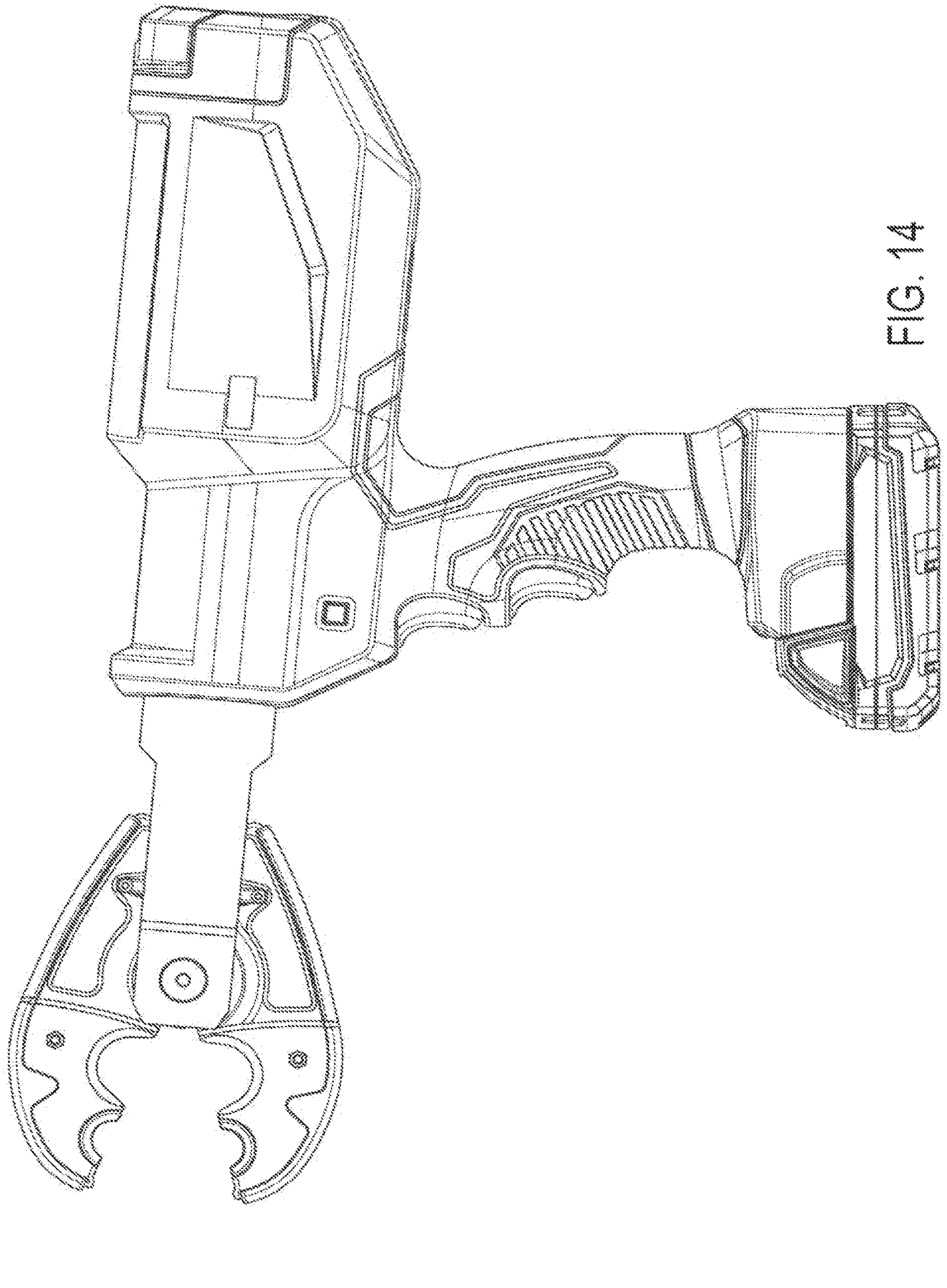
FIG. 14 is a left side view of the hydraulic tool of FIG. 9.
Figure 15:
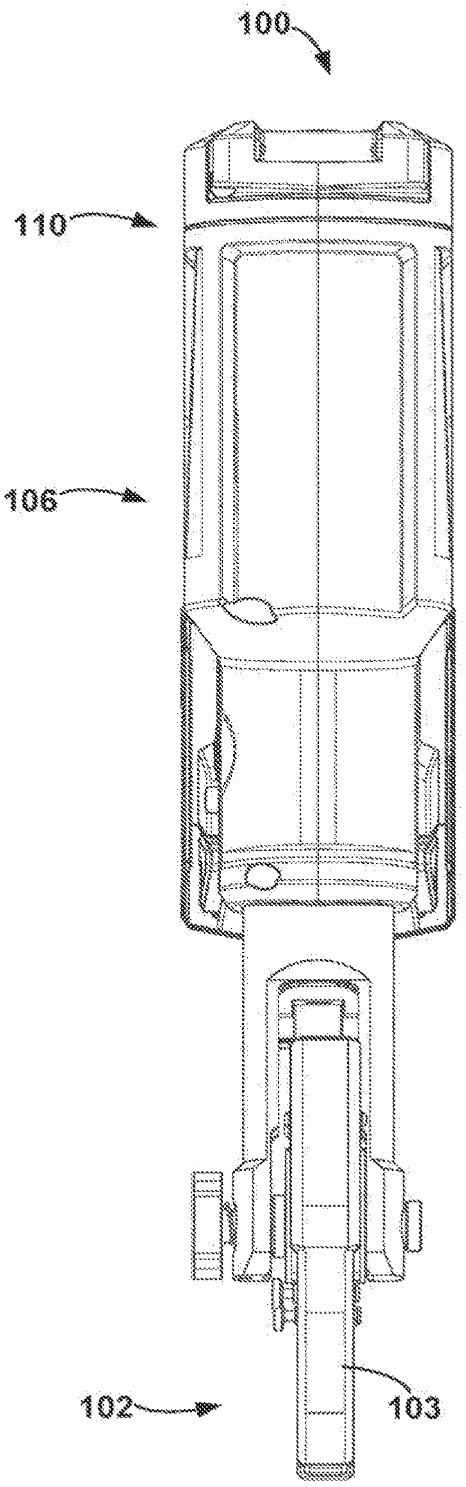
FIG. 15 is a top end view of the hydraulic tool of FIG. 9.
Figure 16:
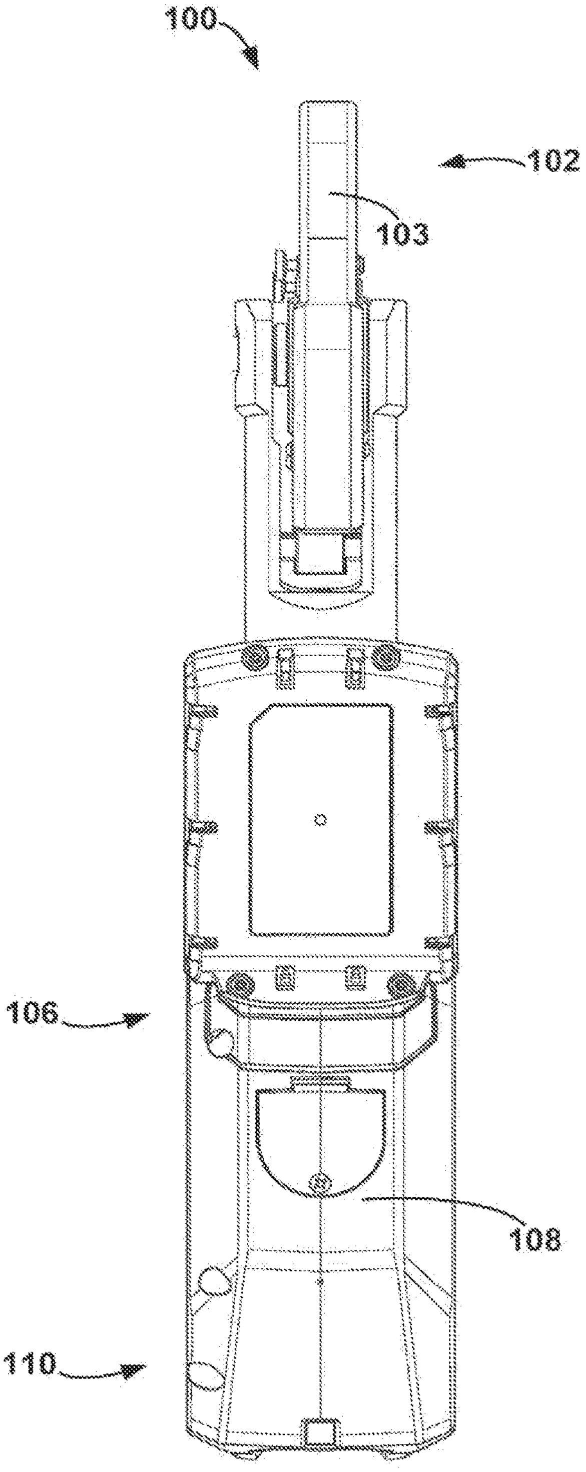
FIG. 16 is a bottom end view of the hydraulic tool of FIG. 9.

FIGS. 11-16 illustrate additional view of the hydraulic tool 100 according to embodiments of the invention. In particular, FIG. 11 is a front end view of the hydraulic tool 100 shown in FIGS. 9 and 10, FIG. 12 is a back end view of the hydraulic tool 100 shown in FIGS. 9-11, FIG. 13 is a right side view of the hydraulic tool 100 shown in FIGS. 9-12. FIG. 14 is a left side view of the hydraulic tool 100 shown in FIGS. 9-13, FIG. 15 is a top end view of the hydraulic tool 100 shown in FIGS. 9-14, and FIG. 16 is a bottom end view of the hydraulic tool 100 shown in FIGS. 9-15.

Figure 17:
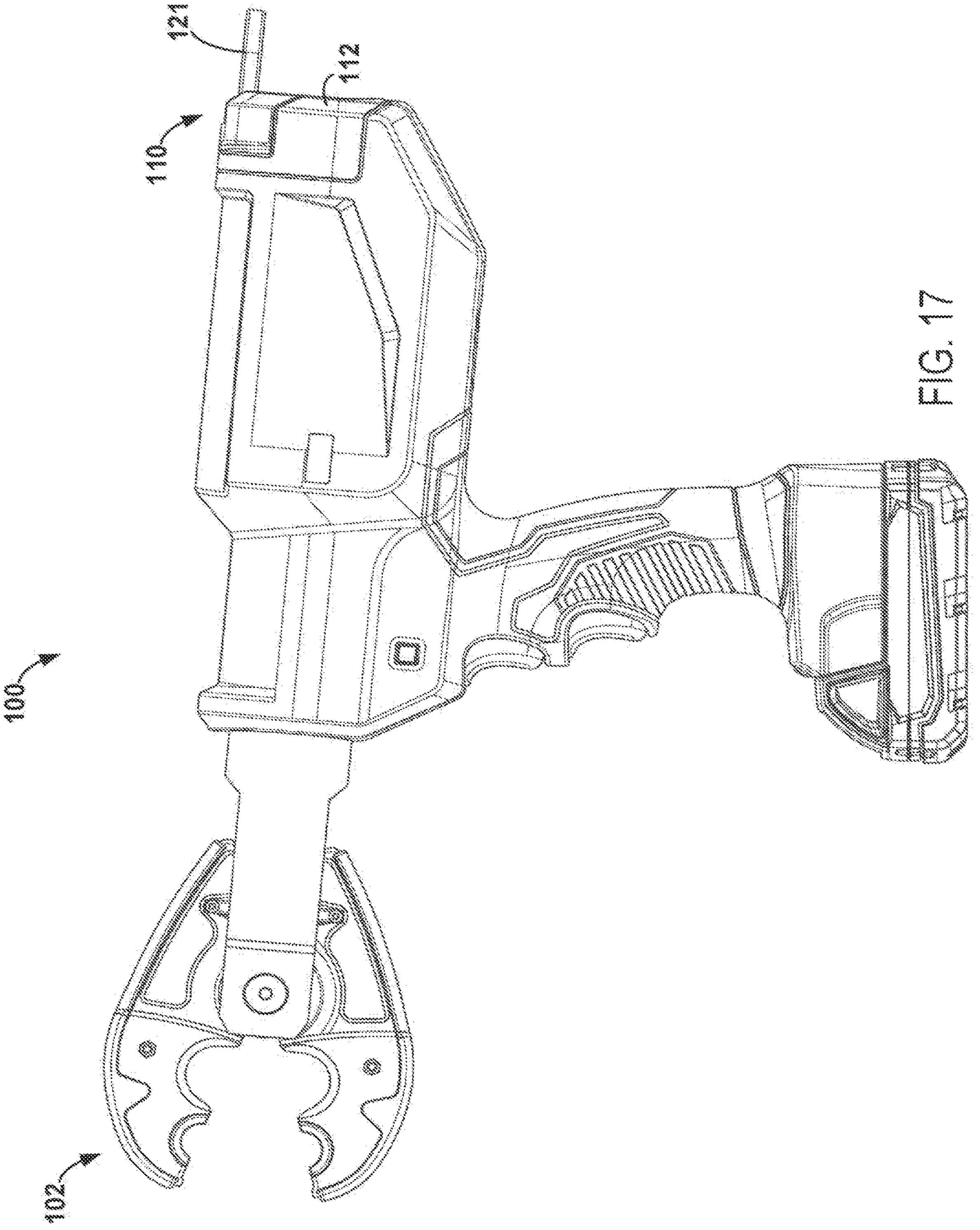
FIG. 17 is a left side view of a hydraulic tool showing an attachment loop in an extended position according to one embodiment of the invention.
Figure 18:
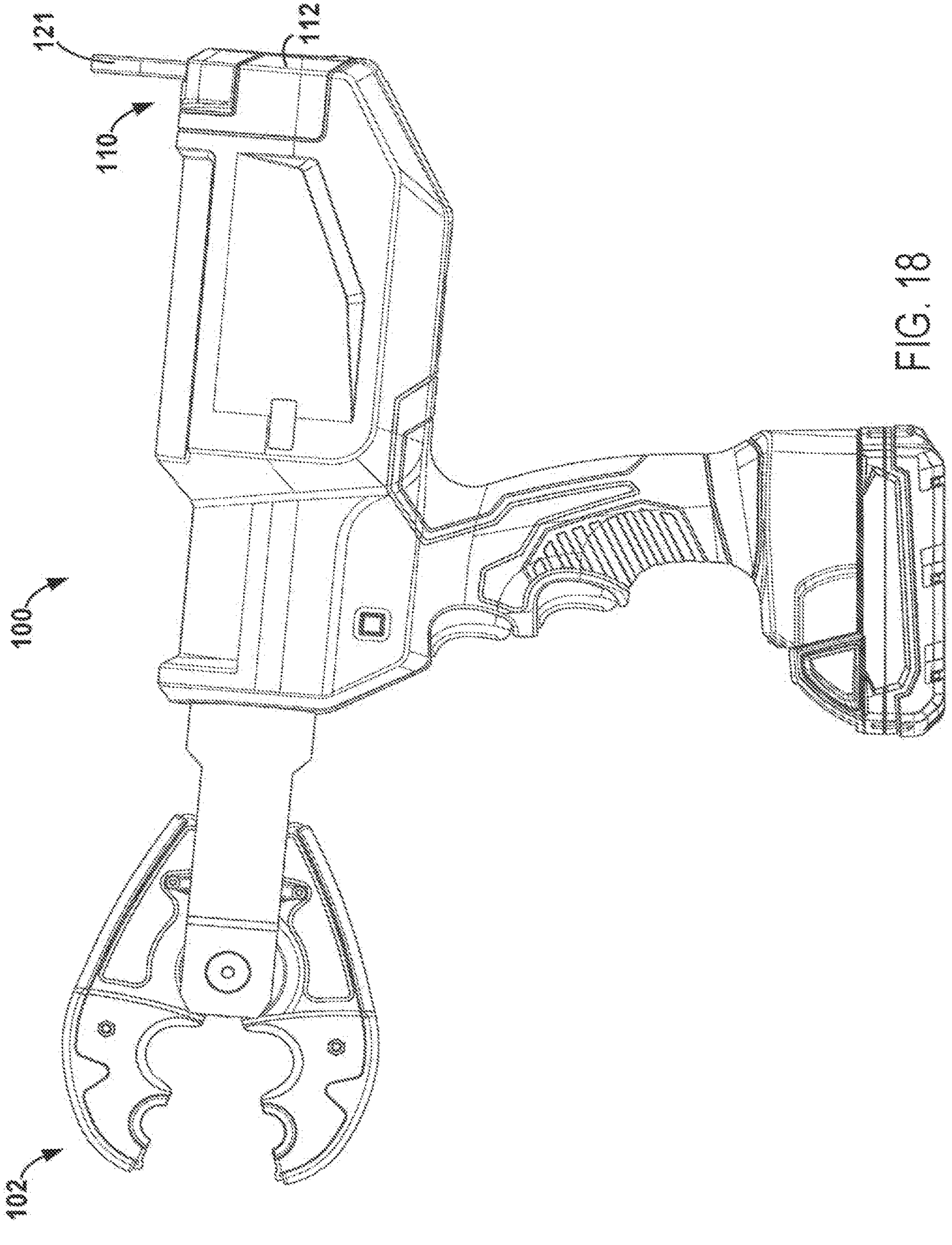
FIG. 18 is a left side view of the hydraulic tool of FIG. 17 showing the attachment loop in an upright position.
Figure 19:
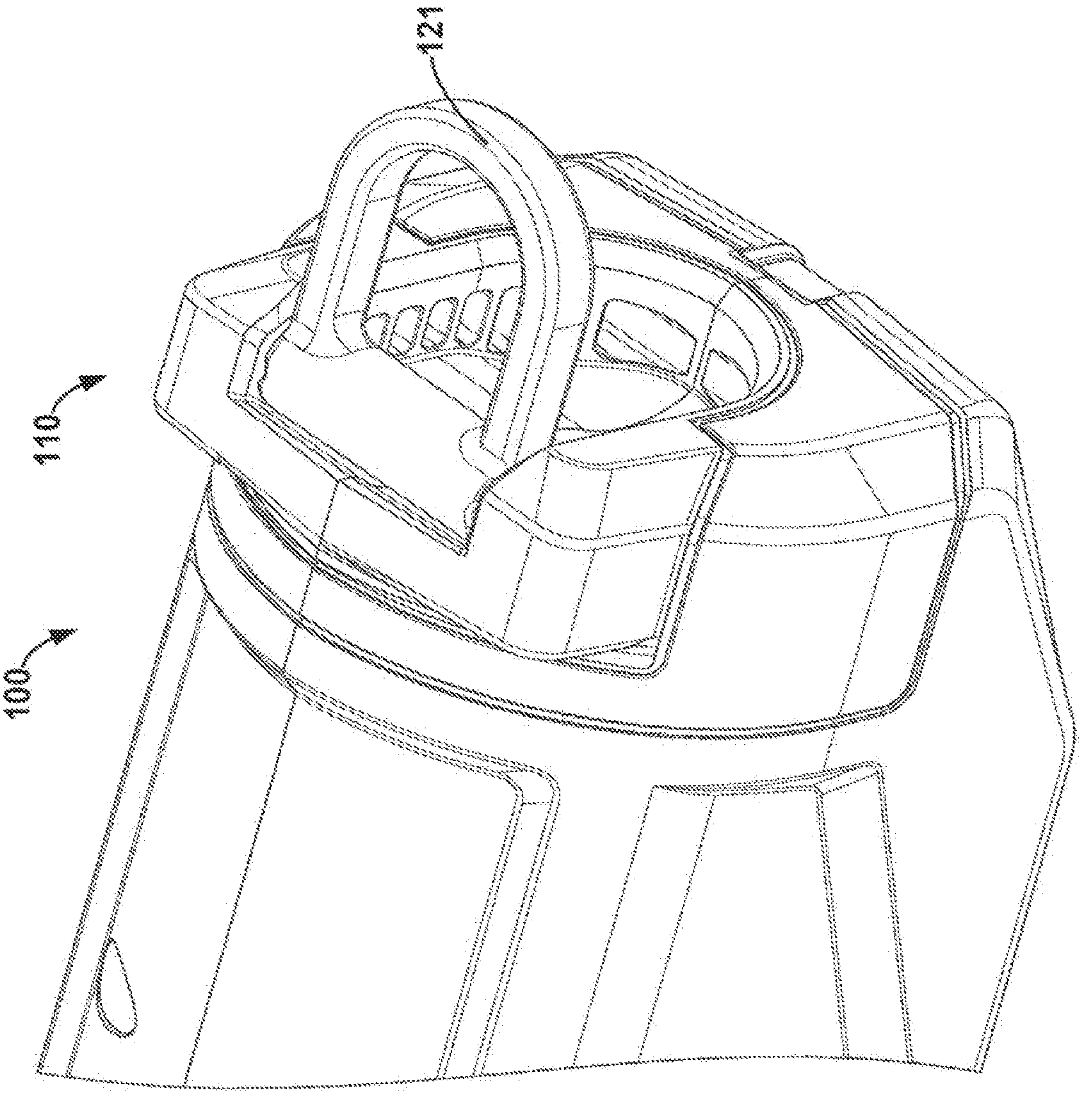
FIG. 19 is a close up perspective view of the hydraulic tool of FIG. 17 showing the attachment loop the an extended position.

FIGS. 17-19 illustrate the hydraulic tool 100 according to another embodiment of the invention. In the embodiment shown in FIGS. 17-19, the hydraulic tool 100 includes an attachment loop 121. The attachment loop 121 can be used in a variety of hydraulic tools, including the embodiments of the hydraulic tool 100 shown in each of FIGS. 1-8 and FIG. 9-16.

FIGS. 17 and 19 illustrate the hydraulic tool 100 with the attachment loop 121 in an extended position and FIG. 18 illustrates the hydraulic tool 100 with the attachment loops 121 in an upright position.

As shown in FIGS. 17-19, the attachment loop 121 is attached to the back portion 110. In the retracted position as shown, for example, in FIGS. 1-16, the adjustable loop 121 is between the head 102 and the second surface 112. In the extended position shown in FIG. 17, the adjustable loop 121 extends beyond the second surface 112. In the upright position shown in FIG. 18, the adjustable loop 121 is between the head 102 and the second surface 112 (e.g., as projected onto the longitudinal axis of the hydraulic tool 100). In some embodiments, the adjustable loop 121 is can be used for hanging the hydraulic tool 100 on a hook or a belt loop, for example.

Figure 20:
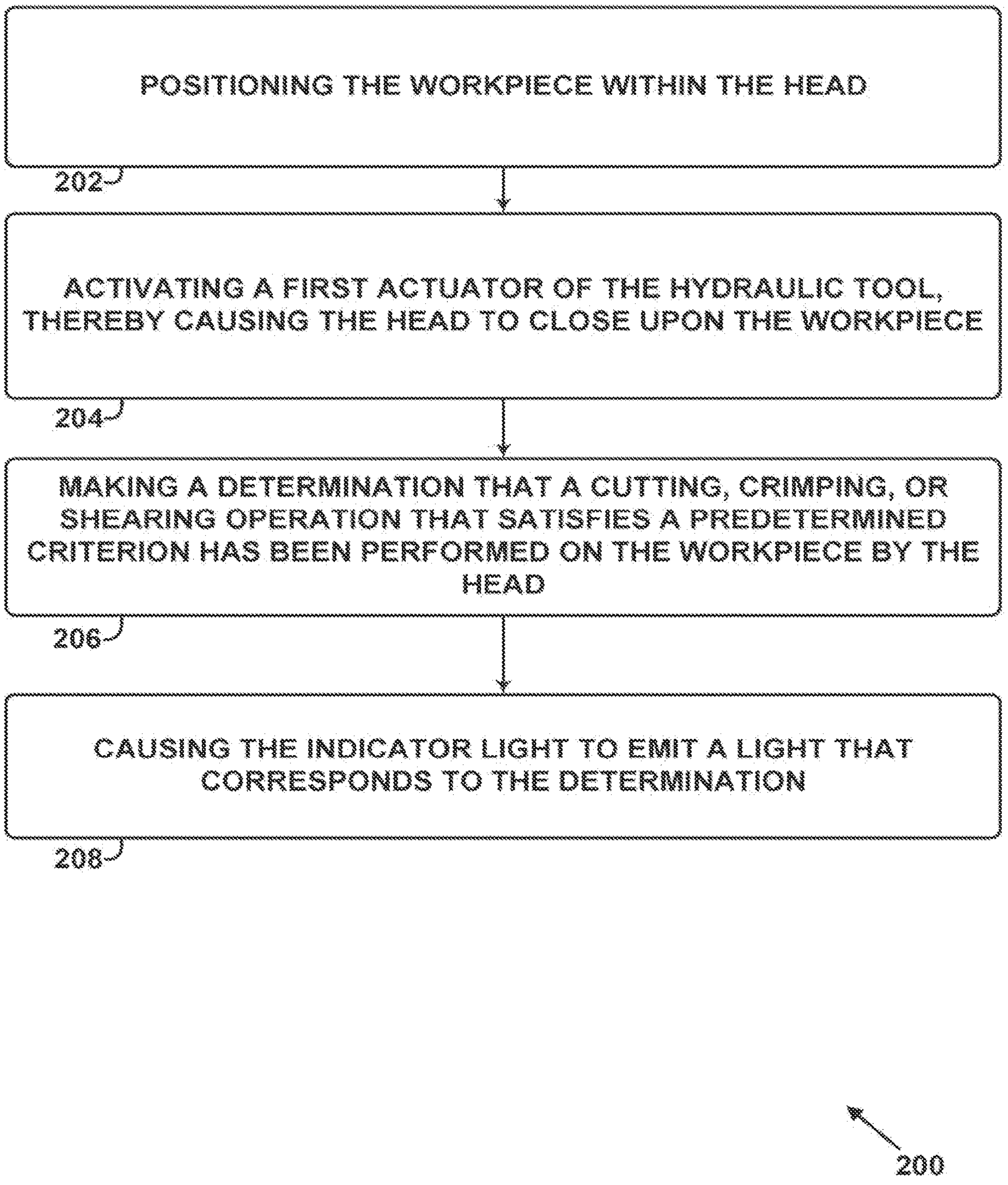
FIG. 20 is a block diagram of a method according to one embodiment of the invention.

FIG. 20 is a block diagram of a method 200 of operating a hydraulic tool, such as the hydraulic tool 100 (e.g., any embodiment of the hydraulic tool 100 described herein). By way of example, the method 200 will be described below with reference to the hydraulic tool 100. At block 202, the method 200 includes positioning the work piece within the head 102. For example, a user could place a work piece between the jaws 103. At block 204, the method 200 includes activating the first actuator 130 of the hydraulic tool 100, thereby causing the head 102 (e.g., the jaws 103) to close upon the work piece.

At block 206, the method 200 includes making a determination that a cutting, crimping, or shearing operation that satisfies a predetermined criterion has been performed on the work piece by the head 102. For example, making the determination can include a control system of the hydraulic tool 100 determining that a pressure that has been applied by the head 102 upon the work piece exceeds a threshold pressure (for example, the pressure threshold can be between approximately 5,000 psi and approximately 10,000 psi, or, for example, approximately 7,200 psi). Additionally or alternatively, making the determination can include the control system determining that a distance 210 (see FIG. 1) between jaws 103 of the head 102 is less than a threshold distance. Such threshold distance can correspond to a completion of an action performed on a work piece. For example, an approximately zero inch distance (i.e., the jaws are touching) can correspond to a completed cut of the work piece. In another example, a particular non-zero distance can correspond to a completed crimp of the work piece. At block 208, the method 200 includes causing the indicator light 118 to emit a light (e.g., a green light) that corresponds to the determination.

Figure 21:
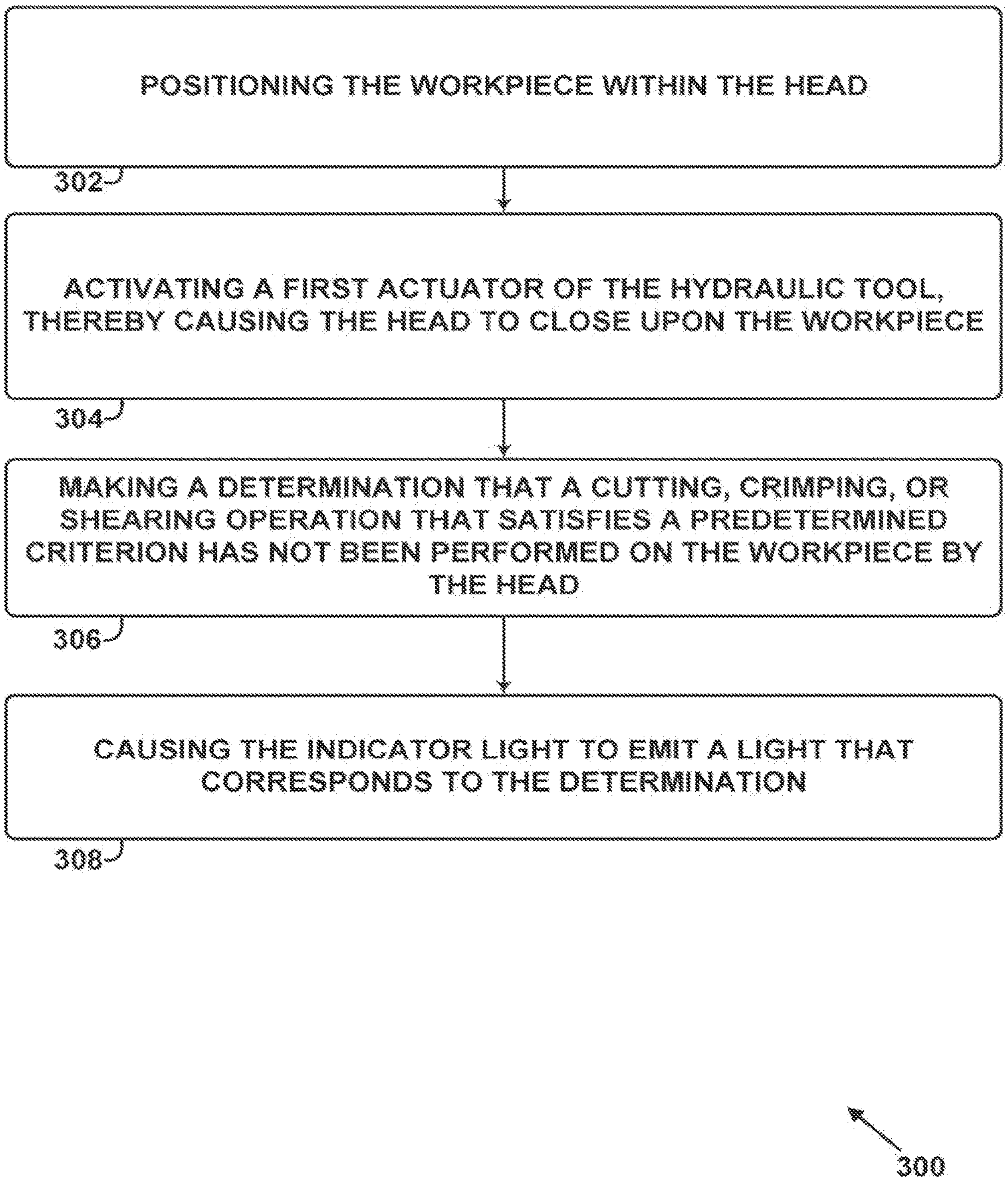
FIG. 21 is a block diagram of a method according to another embodiment of the invention.

FIG. 21 is a block diagram of a method 300 of operating a hydraulic tool, such as the hydraulic tool 100. By way of example, the method 300 will be described below with reference to the hydraulic tool 100. At block 302, the method 300 includes positioning the work piece within the head 102. For example, a user could place a work piece between the jaws 103. At block 304, the method 300 includes activating the first actuator 130 of the hydraulic tool 100, thereby causing the head 102 (e.g., the jaws 103) to close upon the work piece.

At block 306, the method 300 includes making a determination that a cutting, crimping, or shearing operation that satisfies a predetermined criterion has not (e.g., yet) been performed on the work piece by the head 102. For example, making the determination can include a control system of the hydraulic tool 100 determining that a pressure that has been applied by the head 102 upon the work piece has not exceeded a threshold pressure (for example, the pressure threshold can be between approximately 5,000 psi and approximately 10,000, or, for example, approximately 7,200 psi). Additionally or alternatively, making the determination can include the control system determining that a distance 210 (see FIG. 1) between jaws 103 of the head 102 is greater than a threshold distance, as described above with respect to method 200. Furthermore, making the determination can include the control system determining that the first actuator 130 has been activated for at least a threshold duration. At block 308, the method 300 includes causing the indicator light 118 to emit a light (e.g., a red light) that corresponds to the determination.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

The invention claimed is:

1. A hydraulic tool comprising:
- a head at a first end of the hydraulic tool, the head configured to apply a mechanical force to a work piece;
- a body comprising a first surface;
- a back portion comprising:
  - a second surface at a second end of the hydraulic tool that is opposite the first end;
  - a third surface that is between the first surface and the second surface, the third surface inclined with respect to the first surface and the second surface, the third surface including a first portion that abuts the second surface, the third surface including a second portion that abuts the first surface;
  - an indicator light; and
  - a window, at least a portion of the window being positioned on the third surface, the window overlapping the first portion and the second portion of the third surface, the window covering the indicator light; and
- a grip that extends from the body away from the first surface.

2. The hydraulic tool of claim 1, wherein the head is configured to crimp the work piece.

3. The hydraulic tool of claim 1, wherein the head is configured to cut the work piece.

4. The hydraulic tool of claim 1, wherein the head is configured to shear the work piece.

5. The hydraulic tool of claim 1, wherein the head is configured to be hydraulically actuated.

6. The hydraulic tool of claim 1, wherein the first surface is parallel to a longitudinal axis of the hydraulic tool.

7. The hydraulic tool of claim 1, wherein the second surface is perpendicular to a longitudinal axis of the hydraulic tool.

8. The hydraulic tool of claim 1, wherein the window is elongated in a direction that is substantially perpendicular to a boundary that separates the first portion from the second portion.

9. The hydraulic tool of claim 1, wherein the window is rounded such that it conforms to the second surface, the first portion, and the second portion.

10. The hydraulic tool of claim 1, wherein the window is elongated in a direction that is substantially parallel to a boundary that separates the first portion from the second portion.

11. The hydraulic tool of claim 10, wherein the window is rounded such that it conforms to the first portion and the second portion.

12. The hydraulic tool of claim 1, wherein the hydraulic tool is configured to:
- make a first determination that a cutting, crimping, or shearing operation that satisfies a predetermined criterion has been performed on the work piece by the head; and
- cause the indicator light to emit a first light that corresponds to the first determination.

13. The hydraulic tool of claim 1, wherein the hydraulic tool is configured to:
- make a second determination that a cutting, crimping, or shearing operation that satisfies a predetermined criterion has not been performed on the work piece by the head; and
- cause the indicator light to emit a second light that corresponds to the second determination.

14. The hydraulic tool of claim 1, wherein the grip is a pistol grip.

15. The hydraulic tool of claim 1, the grip comprising a first actuator that, when activated, causes the head to close upon the work piece.

16. The hydraulic tool of claim 1, the grip comprising a second actuator that, when activated, causes the head to open away from the work piece.

17. A hydraulic tool comprising:

a head at a first end of the hydraulic tool, the head configured to apply a mechanical force to a work piece;

a body comprising a first surface;

a back portion comprising:

a second surface at a second end of the hydraulic tool that is opposite the first end;

a third surface between the first surface and the second surface, the third surface inclined with respect to the first surface and the second surface;

an indicator light;

a window, at least a portion of the window being positioned on the third surface, the window covering the indicator light;

a grip that extends from the body away from the first surface; and an adjustable loop attached to the back portion.

18. The hydraulic tool of claim 17, wherein in a retracted position, the adjustable loop is between the head and the second surface.

19. The hydraulic tool of claim 17, wherein in an extended position, the adjustable loop extends beyond the second surface.

20. The hydraulic tool of claim 17, wherein in an upright position, the adjustable loop is between the head and the second surface.

21. A method of operating a hydraulic tool to apply a mechanical force to a work piece, the method comprising:

positioning the work piece within a head;

activating a first actuator of the hydraulic tool, causing the head to close upon the work piece;

making a first determination that a cutting, crimping, or shearing operation that satisfies a predetermined criterion has been performed on the work piece by the head;

causing an indicator light to emit a light that corresponds to the first determination;

making a second determination that a cutting, crimping, or shearing operation that satisfies the predetermined criterion has not been performed on the work piece by the head; and causing an indicator light to emit a light that corresponds to the second determination.

22. The method of claim 21, wherein making the first determination and making the second determination further comprises determining that a pressure that has been applied by the head upon the work piece exceeds a threshold pressure.

23. The method of claim 21, wherein making the first determination and making the second determination further comprises determining that a distance between jaws of the head is less than a threshold distance.

* * * * *